US005801640A

United States Patent [19]

Yoshizawa

[11] Patent Number: 5,801,640
[45] Date of Patent: Sep. 1, 1998

[54] RADIO PAGER WITH A MESSAGE PROCESSING FUNCTION

[75] Inventor: Shigeo Yoshizawa, Tokyo, Japan

[73] Assignee: NEC Corporation, Tokyo, Japan

[21] Appl. No.: 956,932

[22] Filed: Oct. 23, 1997

Related U.S. Application Data

[63] Continuation of Ser. No. 474,521, Jun. 7, 1995, abandoned, which is a continuation of Ser. No. 5,613, Jan. 19, 1993, abandoned.

[30] Foreign Application Priority Data

Jan. 17, 1992 [JP] Japan .................................... 4-026126

[51] Int. Cl.[6] ........................................ H04Q 7/18

[52] U.S. Cl. .................................. 340/825.44; 340/311.1; 340/825.47; 340/825.69; 455/426; 455/31.2; 455/38.4; 370/310

[58] Field of Search ........................... 340/311.1, 825.44, 340/825.47, 825.69; 455/31.1, 458, 426, 526, 517, 31.2, 38.1, 38.4; 370/310, 312, 313, 314

[56] References Cited

U.S. PATENT DOCUMENTS

| | | | |
|---|---|---|---|
| 4,336,524 | 6/1982 | Levine | 340/825.44 X |
| 4,994,784 | 2/1991 | Yoon | 340/825.44 |
| 5,012,234 | 4/1991 | Dulaney et al. | 340/825.44 |
| 5,087,905 | 2/1992 | Kuramatsu et al. | 340/825.44 |
| 5,095,307 | 3/1992 | Shimura et al. | 340/825.44 |
| 5,107,259 | 4/1992 | Weitzen et al. | 340/825.44 |
| 5,173,688 | 12/1992 | DeLuca et al. | 340/825.44 |
| 5,307,059 | 4/1994 | Connary et al. | 340/825.44 |
| 5,317,621 | 5/1994 | Shibayama | 340/825.44 |
| 5,574,439 | 11/1996 | Miyashita | 340/825.44 |

FOREIGN PATENT DOCUMENTS

| | | | |
|---|---|---|---|
| 218936 | 4/1987 | European Pat. Off. | 340/825.44 |
| 2128004 | 8/1983 | United Kingdom . | |
| 91/03040 | 7/1990 | WIPO . | |

OTHER PUBLICATIONS

Motorola "PMR 2000 Personal Message Receiver" Documentation, (1986).

*Primary Examiner*—Brian Zimmerman
*Assistant Examiner*—William H. Wilson, Jr.
*Attorney, Agent, or Firm*—Ostrolenk, Faber, Gerb & Soffen, LLP

[57] ABSTRACT

A radio pager capable of processing a received message to add information to the message, so that the user may easily see the message on a display. Hyphens or similar symbols are added to a received message signal consisting only of numerals to thereby make it easy to see as a telephone number. The message with such symbols appears on a display. The positions for inserting the symbols are stored in the pager beforehand.

6 Claims, 4 Drawing Sheets

Fig. 2 PRIOR ART

| 4-BIT CODE | CHARACTER |
|---|---|
| 0 0 0 0 | 0 |
| 0 0 0 1 | 1 |
| 0 0 1 0 | 2 |
| 0 0 1 1 | 3 |
| 0 1 0 0 | 4 |
| 0 1 0 1 | 5 |
| 0 1 1 0 | 6 |
| 0 1 1 1 | 7 |
| 1 0 0 0 | 8 |
| 1 0 0 1 | 9 |
| 1 0 1 0 | SPARE |
| 1 0 1 1 | U |
| 1 1 0 0 | Space |
| 1 1 0 1 | – |
| 1 1 1 0 | ] |
| 1 1 1 1 | [ |

RADIO PAGER WITH A MESSAGE PROCESSING FUNCTION

This is a Continuation of application Ser. No. 08/474,521, filed on Jun. 7, 1995, now abandoned, which is a Continuation of application Ser. No. 08/005,613, filed on Jan. 19, 1993, now abandoned.

BACKGROUND OF THE INVENTION

The present invention relates to a radio pager and, more particularly, to a radio pager capable of adding information to a received message by editing the message, so that the user of the pager may easily see it.

Today, a data display radio pager is extensively used which not only alerts the user to the reception of a call by sound or vibration but also decodes and displays a message signal received after an address number. Particularly, a numeral display radio pager produces a message in the form of a combination of numerals 0–9 and some symbols. This type of radio pager allows a message to be readily transmitted from an ordinary telephone terminal. Moreover, since the content of a message is limited to, for example, a telephone number and since the message is as short as about ten to twenty characters, the numeral display radio pager does not need a long air time. Typical of signal systems applicable to the numeral display radio pager is a POCSAG signal system using 4-bit codes each representing a particular numeral or a particular symbol. However, assume that a telephone number "012-345-6789" is to be sent to such a radio pager. Then, a signal representative of "- (hyphen)" should be entered after each of numerals "2" and "5".

Regarding a telephone terminal, for example, keys "*" and "2" have to be pressed. This is not only troublesome but also causative of erroneous operations. Moreover, although the above telephone number includes only ten numerals, i.e., two words in the case of the POCSAG system, the actual number of words is three due to two hyphens added to the numerals, increasing the air time. Of course, sending only the numerals, i.e., omitting the hyphens will simplify the inputting operation at a calling station. However, the telephone number without the hyphens appearing on the display of the radio pager would be difficult to read.

SUMMARY OF THE INVENTION

It is, therefore, an object of the present invention to provide a radio pager which simplifies a message sending operation to be performed at a calling station, reduces the air time and thereby promotes effective use of electromagnetic waves, and displays a message in an easy-to-see form.

In accordance with the present invention, a radio pager having a function of processing a received message comprises a receiving section for receiving a carrier wave modulated by an address signal and a message signal following the address signal, a demodulator for demodulating the carrier wave, a decoder for decoding the address signal and the message signal demodulated by the demodulating section in a predetermined signal format, an alerting device for alerting the user of the radio pager to a call, a controller for comparing the address signal decoded by the decoder with an address signal assigned to the radio pager and, if the two address signals are identical, driving the alerting section, and a display for displaying the received message. The controller has a function of inserting a predetermined symbol in a predetermined figure position of the received message signal.

Further, the controller may be provided with a table listing character series and have a function of inserting a predetermined symbol before or after a character series identical with any one of the character series of the table, and a function of inserting a predetermined symbol in a predetermined figure position of the received message signal.

BRIEF DESCRIPTION OF THE DRAWINGS

The above and other objects, features and advantages of the present invention will become more apparent from the following detailed description taken with the accompanying drawings in which:

FIG. 2 shows specific 4-bit codes and associated numerals and symbols particular to the POCSAG signal format;

DESCRIPTION OF THE PREFERRED EMBODIMENT

Figure 1:
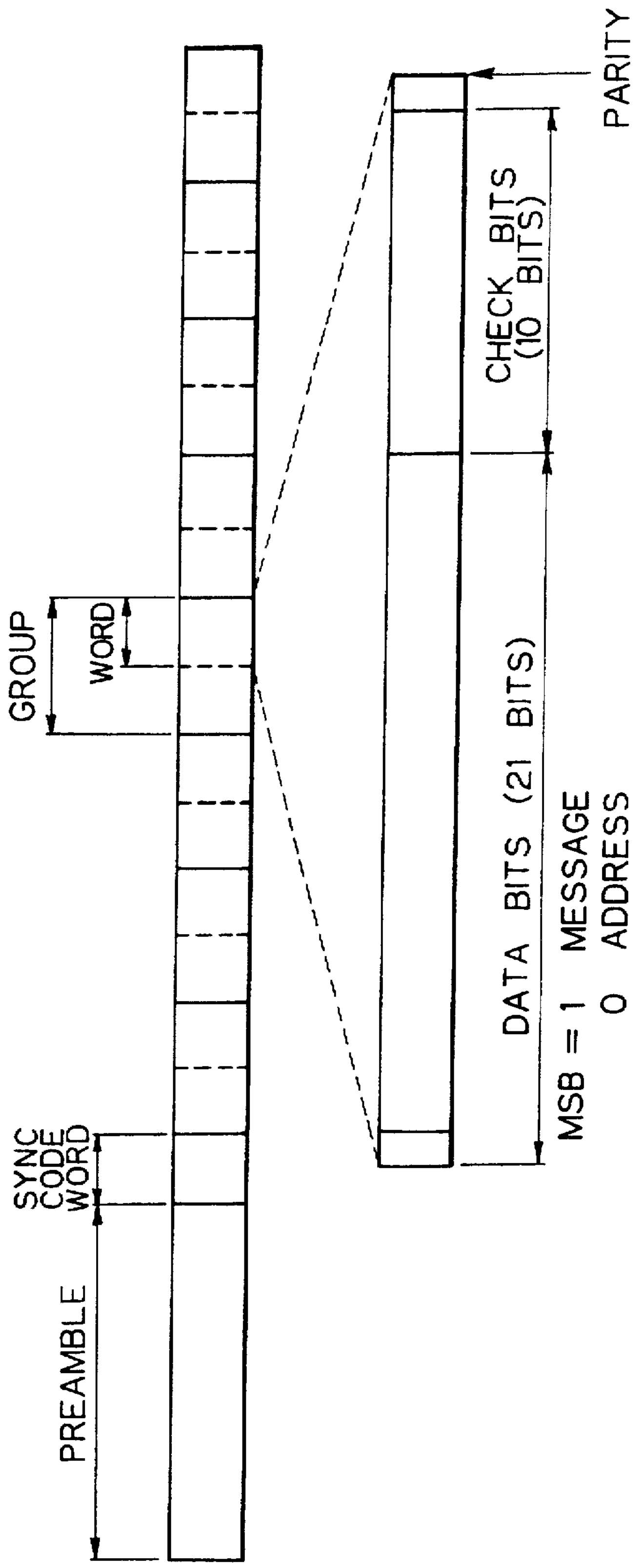
Fig. 1 PRIOR ART
FIG. 1 shows a POCSAG signal format which is a specific form of signal format applicable to a radio pager.

Referring to FIG. 1 of the drawings, a POCSAG signal format which is a typical signal format applicable to a numeral display radio pager is shown. FIG. 2 lists specific 4-bit data particular to the POCSAG system. It has been customary with a radio pager to decode message data sent in the format of FIG. 1, decode them according to the table of FIG. 2, and then display them on a display. The conventional radio pager has some problems left unsolved, as discussed earlier. Specifically, assume that a telephone number "012-345-6789" is to be sent to a radio pager. Then, a signal representative of "- (hyphen)" should be entered after each of numerals "2" and "5". Regarding a telephone terminal, for example, keys "1" and "2" have to be pressed. This is not only troublesome but also causative of erroneous operations. Moreover, although the above telephone number includes only ten numerals, i.e., two words in the case of the POCSAG system, the actual number of words is three due to two hyphens added to the numerals, increasing the air time. Of course, sending only the numerals, i.e., omitting the hyphens will simplify the inputting operation at a calling station. However, the telephone number without the hyphens appearing on the display of the radio pager would be difficult to read.

Figure 3:
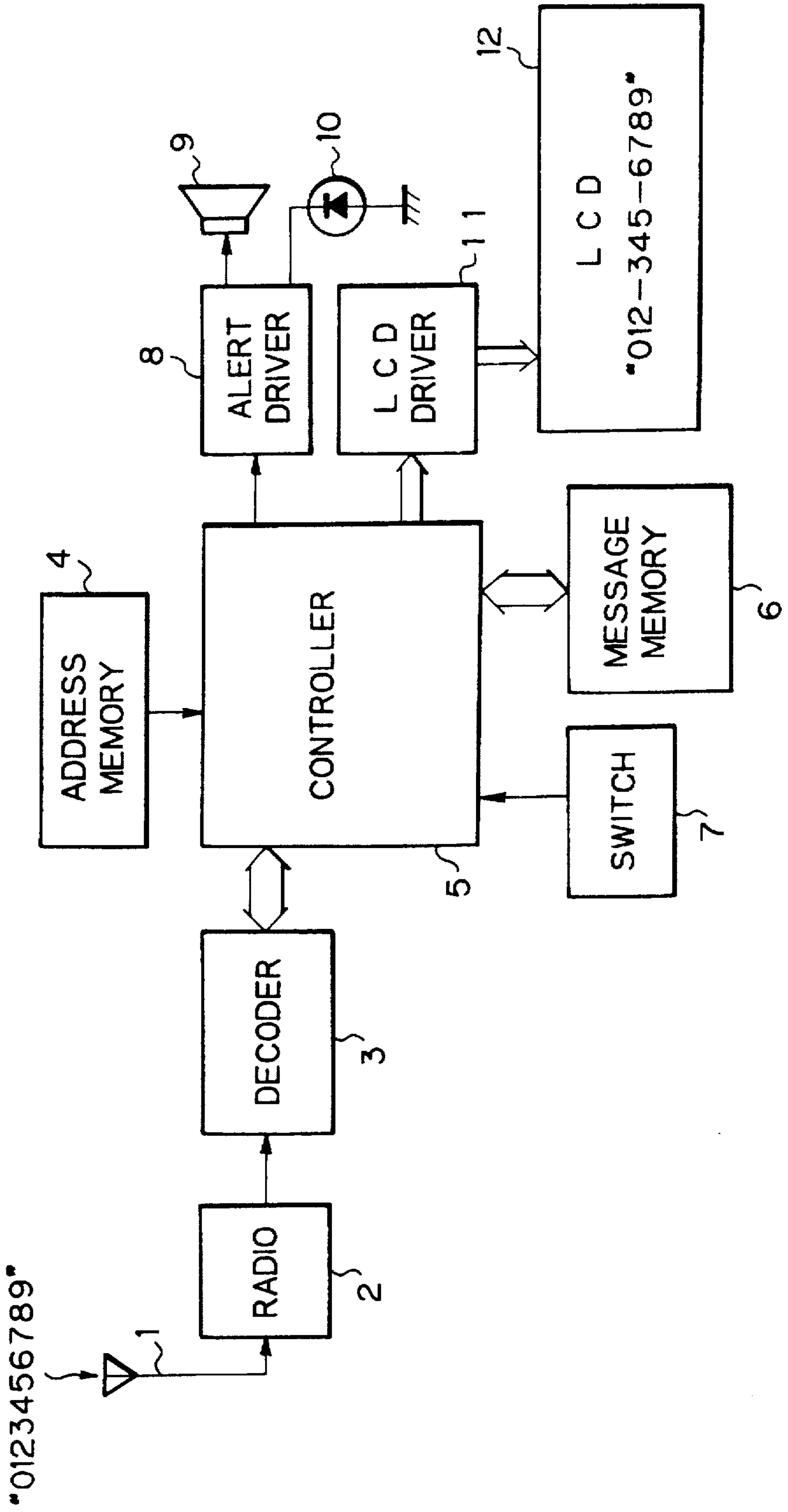
FIG. 3 is a block diagram schematically showing a radio pager embodying the present invention.

Referring to FIG. 3 a radio pager embodying the present invention will be described which eliminates the above-stated problems. As shown, the radio pager has an antenna 1 and a radio section 2 connected to the antenna 1. A radio signal modulated by an address signal and a message signal associated therewith is received by the antenna 1 and then amplified and demodulated by the radio section 2. The resulting baseband signal is applied to a decoder 3 to undergo bit synchronization and word synchronization and further to error correction using a particular code system. An address signal assigned to the radio pager and stored in an address memory 4 is read out via a controller 5 and fed to the decoder 3. The decoder 3 compares the received address signal with the address signal read out of the memory 4. If the two address signals compare equal, the decoder 3 delivers a coincidence signal and the message signal following the address signal to the controller 5.

In response, the controller 5 causes an alert driver 8 to drive a speaker 9 and an LED (Light Emitting Diode) 10, thereby alerting the user to the reception of a call. It is to be noted that the kind of the alerting device and how to produce an alert (or how to hold it) depends on the settings of each radio pager. The controller 5 writes the received message signal in a message memory 6 and displays a message represented by the signal on an LCD (Liquid Crystal Display) 12 via an LCD driver 11 in the form of characters. Also shown in FIG. 3 is a switch 7 which may be operated to, for example, reset the alert and display or to read out a stored message again.

In the illustrative embodiment, while the message signal sent to the radio pager consists only of numerals, e.g., "0123456789", what appears on the LCD 12 is "012-345-6789" including two hyphens. The controller 5 so edits the received message signal to display, for example, a telephone number which is easy to see.

Figure 4:
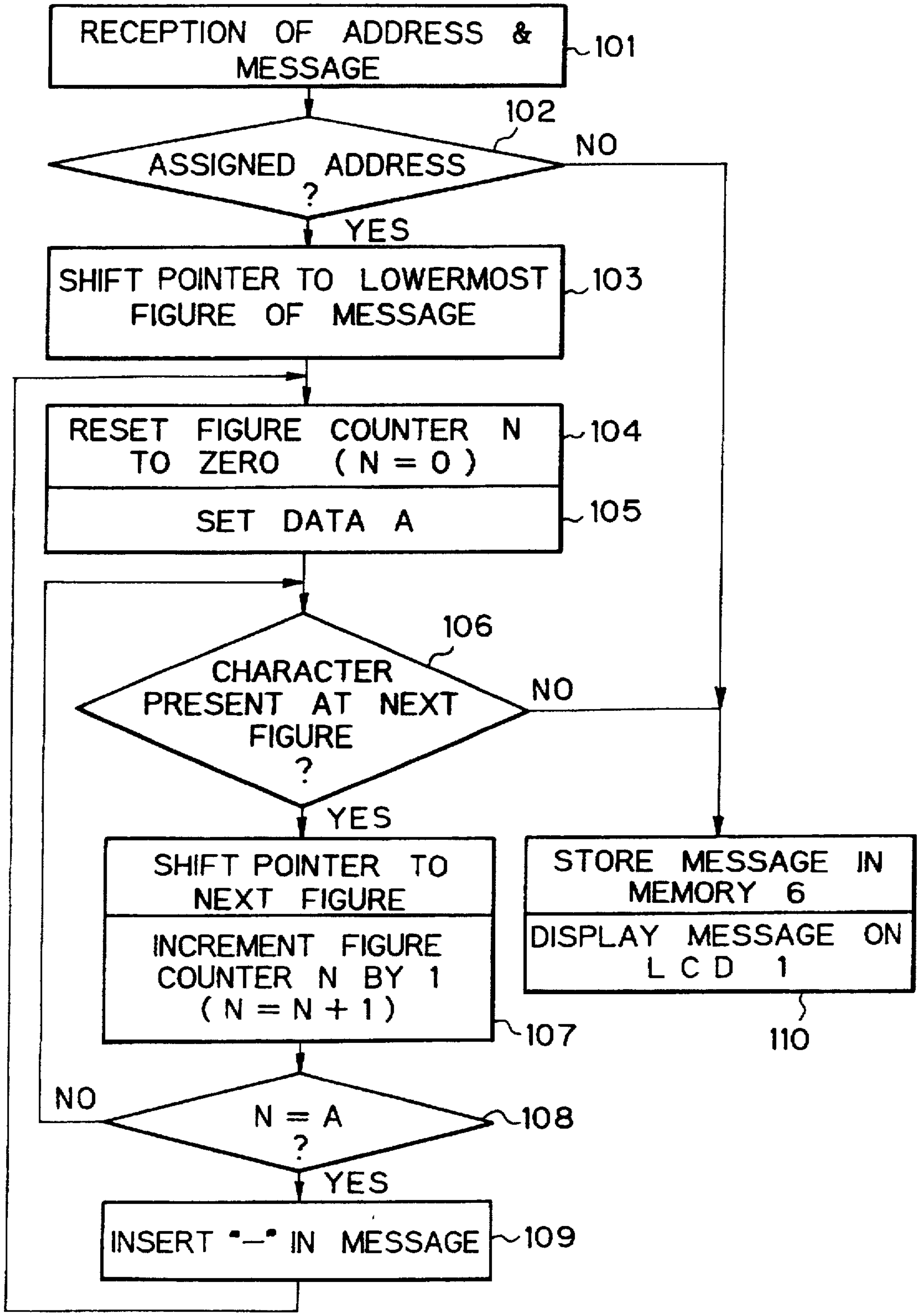
FIG. 4 is a flowchart demonstrating a specific procedure which the embodiment executes for editing a received message signal.

A reference will be made to FIG. 4 for describing a specific procedure for the controller 5 to edit the message signal as stated above. As shown, on receiving the address and message (step 101), the controller 5 determines whether or not to execute the function particular to the embodiment on the basis of the received address (step 102). When a plurality of addresses are assigned to the radio pager, with which of the addresses the function of the embodiment should be executed is stored in the address memory 4 beforehand. If the received address is the one needing the function of interest, the controller 5 shifts a pointer to the lowermost figure of the message (step 103), resets a figure counter N to zero (step 104), and then sets data A indicative of a particular figure where a hyphen should be inserted (step 105). The controller 5 determines whether or not a character exists at the figure next to the figure which the pointer is pointing (step 106). If the answer of the step 106 is positive, YES, the controller 5 shifts the pointer to the higher figure and increments the figure counter N by 1 (one) (step 107). As soon as the counter N reaches the number A set beforehand (step 108), the controller 5 inserts a hyphen in the message (step 109). The data or number A may be, but not limited to, "4" at first and then replaced with "3" after the insertion of the hyphen. If no characters exist at the figure next to the figure being pointed by the pointer (NO, step 106), the controller 5 writes the message signal in the message memory 6 while displaying it on the LCD 12 (step 110). This also true when the received address is not the one needing the function of the embodiment (step 110).

The embodiment decides whether or not to execute the function of interest on the basis of the received address, as stated above. Alternatively, for such a decision, a particular decision bit may be added to the leading end of a message.

Hyphens indicative of a telephone number are often replaced with a bracket "( )". With the illustrative embodiments, it is also extremely easy to substitute a bracket for hyphens.

The embodiment shown and described is directly applicable to nations where the telephone number consists of a toll exchange number and a local exchange number each having a predetermined number of figures, e.g., U.S.A. In Japan, for example, the telephone number sequence depends on the area. In such a case, a table listing character series representative of toll exchange numbers will be used to determine positions for inserting a hyphen. Specifically, such a table listing toll exchange numbers will be built in the controller 5 or located outside of the same in the form of a memory. Then, when the leading character series of a message is identical with any one of the character series of the table, it will be bracketed or followed by a hyphen to distinguish the toll exchange number. A hyphen will be inserted between the exchange number and the telephone number according to the procedure shown in FIG. 4.

In summary, it will be seen that the present invention provides a radio pager which automatically inserts hyphens or similar symbols to a received message consisting only of numerals, thereby distinguishing different groups of numerals. This simplifies the transmission of a telephone number at a calling station, promotes effective use of electromagnetic waves, and allows the user of the radio pager to easily see a message appearing thereon.

Various modifications will become possible for those skilled in the art after receiving the teachings of the present disclosure without departing from the scope thereof.

What is claimed is:

1. Radio pager comprising:

receiving means for receiving a signal including address information and message information including a plurality of figures;

address storing means for storing address information particular to said radio pager;

editing means for editing the signal received by said receiving means; said editing means comprising means for comparing the received address to a preselected address stored in said address storing means to detect a coincidence therebetween, and means responsive to a detected coincidence between the received address and the preselected address for inserting a first predetermined division symbol in the received message between at least one predetermined group of figures and an adjacent group of figures in accordance with predetermined criteria;

means for storing data comprising the received message and the first predetermined division symbol; and means for displaying the stored data comprising the received message and the first predetermined division symbol.

2. The radio pager as claimed in claim 1, wherein the one group is an exchange number, the adjacent group is a telephone number and the first predetermined division symbol is a hyphen.

3. A radio pager as claimed in claim 1, further comprising means including a table listing character series for inserting a second predetermined division symbol before or after a character series identical with any one of said character series of said table.

4. The radio pager as claimed in claim 3, wherein the one group is an exchange number, the adjacent group is a telephone number and the first predetermined division symbol is a hyphen.

5. The radio pager as claimed in claim 4, wherein the second predetermined symbol is a bracket.

6. A radio pager as claimed in claim 3 wherein said table lists toll exchange numbers each having a particular format.

* * * * *